3,175,990
STABILIZATION OF ELASTOMERS CONTAINING UREYLENE GROUPS
Edward Theodore Ruehl, Waynesboro, Va., assignor to E. I. du Pont de Nemours and Company, Wilmington, Del., a corporation of Delaware
No Drawing. Filed June 22, 1960, Ser. No. 37,837
1 Claim. (Cl. 260—41)

This invention relates to the production of elastomeric fibers of improved whiteness and stability from fiber-forming long chain synthetic segmented copolymers, such as those containing segmented aromatic ureylene polymer, and is concerned more particularly with the preparation of dispersions of stabilizers and their incorporation in the spinning solutions from which such fibers are spun.

The fiber-forming elastomeric copolymers used in the present invention may be of the spandex type, which have been defined by the Federal Trade Commission as those in which the fiber-forming substance is a long chain synthetic elastomer comprised of at least 85% of a segmented polyurethane (Official Gazette, volume 740, page 2, March 3, 1959). However, the segmented copolymer may, in general, consist of segments of a high-melting crystalline polymer, which is not limited to the above polyurethane, alternating with segments of a low-melting amorphous polymer derived from, for example, a polyether, a polyester or olefin polymer. The crystalline high-melting segment may, for example, correspond to a bis-ureylene polymer, polyurea, polyurethane, polyamide or polyester. Such elastomeric segmented copolymers are described in U.S. Reissue Patents 24,689 and 24,691, British Patent 779,054, French Patent 1,172,566, and U.S. Patents 2,929,801, 2,929,802, 2,929,803 and 2,929,804. As disclosed in these patents the segmented copolymers in the form of filaments have elongations at the break in excess of 200%, elastic recovery (tensile recovery) above about 90%, and stress decays below about 20%.

In accordance with Arvidson et al. U. S. Patent No. 2,999,839, issued September 12, 1961, fibers prepared from segmented aromatic ureylene-containing copolymer elastomers are stabilized against development of color and loss of mechanical properties on exposure to light, or fumes from combustion, by incorporating therein 1 to 15% by weight of an aliphatic amine and/or a titanium dioxide pigment. Although very substantial improvement in stability results from the practice of this earlier invention, further improvement in initial whiteness and color stability is desired and can be attained by practice of the invention hereinafter described.

An object of this invention is to improve the process for preparing elastomeric fibers, especially from aromatic ureylene-containing copolymers, to provide fibers that exhibit improved initial whiteness and have greater resistance to loss of this initial whiteness. A further object of this invention is to provide a more uniform, stable dispersion of the titanium dioxide pigment and the polymeric aliphatic amine stabilizers in the spinning solution to enable the solution to be spun with greater continuity with the production of more uniform fiber products. Other objects will become apparent from the disclosure and claims.

The objects of the invention are accomplished by the improvement in the process for preparing a spinning solution of elastomeric fiber-forming long chain synthetic segmented copolymers and spinning the solution into filaments, of sand grinding a slurry of titanium dioxide pigment and a polymeric aliphatic amine in a solvent for the segmented copolymer, containing 27–33 parts by weight of pigment and 27–33 parts of polymeric amine per 100 parts of slurry, by high speed agitation with 70–120 parts of 20–40 mesh sand per 100 parts of slurry and then separating the sand to reduce the pigment agglomerates to a particle size of 0.1–1.0 micron and provide a stable, homogeneous dispersion having a viscosity in the range of 5–40 poises, and intimately mixing this initial dispersion with a solvent solution of the segmented copolymer to provide a spinning solution containing 0.5–10% of titanium dioxide, 0.5–10% of the polymeric amine and a concentration of the segmented copolymer suitable for extrusion into filaments. The improved spinning solution dispersion which results provides fibers of markedly improved initial whiteness and stability against loss of whiteness.

Preferably, the initial slurry, which may be prepared from titanium dioxide pigment, comprised of particle aggregates as large as 100 microns, or even 1,000 microns, is composed of about 30% pigment, about 30% of poly-(N,N-diethyl-beta-aminoethyl-methacrylate), referred to hereinafter as poly DEAM, and about 40% dimethylformamide and is ground with 20 to 30 mesh sand in a sand to slurry ratio of about 1:1 by volume for one hour at room temperature to produce a stable, homogeneous dispersion of pigment in the range of 0.1 to 1.0 micron particle size with the dispersion viscosity about 10 poises. While the titanium dioxide may be of any pigment grade, as disclosed in application Serial No. 709,445, now Patent No. 2,999,839, the preferred titanium dioxide is Du Pont's "TiPure" R–610, which has been converted by calcination to the rutile crystalline form and which contains small amounts of zinc oxide, alumina, silica and hydrous titania. The grinding step is suitably carried out with a sand grinder of the type shown in Hochberg et al. U.S. Patent No. 2,855,156, issued October 7, 1958, and assigned to the assignee of the present invention, but the process conditions described above must be observed. In particular, a smaller proportion of solvent or proportion of sand than the specified ranges for grinding will result in an unsatisfactory spinning solution unless the initial dispersion is diluted, settled and filtered to remove a relatively large amount of coarse particles. A more dilute slurry is not sufficiently viscous to meter accurately into the spinning solution.

In the following example, which illustrates a specific embodiment of the invention, quantities are by weight unless otherwise indicated.

EXAMPLE

30 parts of titanium dioxide pigment of "TiPure" R–610 grade and 30 parts of poly DEAM (polydiethylaminoethyl methacrylate) are added to 40 parts of dimethylformamide with stirring to form a somewhat viscous slurry which is pumped at the rate of 2.5 lbs./hr. through the bottom of a sand grinding apparatus such as that shown in FIGURE 1 of U.S. Patent 2,855,156, containing sufficient 20–30 mesh Ottawa sand to provide a sand/slurry ratio of about 1/1 by volume after the apparatus has become filled with slurry. The residence time of the slurry in the sand grinder is one hour. The impeller shaft r.p.m. is 1,300. The dispersion of 0.1–1.0 micron particle size titanium dioxide emanating from the top of the sand grinding apparatus has a viscosity of about 10 poises and is passed through a single layer pulp filter to a storage tank. The dispersion remains stable for a period of over three weeks. From this tank the stable homogeneous dispersion is metered into the polymer solution, prepared as described below, to form a suitable spinning solution.

In preparing the fiber-forming polymer, 425 parts of polytetramethylene ether glycol of molecular weight 1,000 are reacted with 37 parts of 2,4-tolylene diisocyanate (a 2:1 mol ratio) under an atmosphere of nitrogen for 3 hours at 80° C. The product of this reaction, in which polyether glycol chains are coupled one or more times by diisocyanate molecules, is called "dimer." Reaction of 115 parts of bis-(4-isocyanatophenyl)methane with the dimer (in a 2:1 mol ratio) for one hour at 80° C. gives a reaction product in which terminal isocyanate groups are placed at the end of each dimer molecule, called "capped dimer." The capped dimer is "chain extended" by diluting 575 parts with 200 parts dimethylformamide and pouring into 9.5 parts of hydrazine hydrate in 2,000 parts of dimethylformamide.

The prepared dispersion earlier described was accurately metered into this polymer solution to produce a spinning solution containing about 20% of elastomeric polymer, about 1% titanium dioxide and about 1% of poly DEAM. The color of this solution is measurably whiter than similar solutions of like concentration prepared by mixing in titanium dioxide slurry and poly DEAM dispersion separately prepared.

The spinning solution is brought to the top of a 17-foot dry spinning column, heated to a temperature of 60° C. over a period of less than one minute, and extruded into the column through a 15-hole spinneret. The air in the spinning column is heated to 250° C. At the bottom of the dry spinning column, the filaments are allowed to come into contact and coalesce to give a monofilament of about 300 to 400 denier. Upon emergence from the dry spinning column, the monofil is coated with talc (although other suitable finish could be used) to prevent sticking on the spinning package.

Color measurements made of the above product, both in the as-spun condition and after accelerated stability tests in which the monofil was exposed to intense ultraviolet light and to combustion fumes, are shown in the table. The talc was removed by a 30-minute boil-off prior to testing. Samples to be exposed to ultraviolet light were wound on a 3 x 7-inch aluminum plate. Two-gram skeins of the monofil were used for fume exposure. The table shows the results of the measurements on monofil prepared in accordance with the example in comparison with the same measurements on identical filament production from spinning solution of like concentration but prepared by adding separately to the polymer solution a solution of poly DEAM and a dispersion of titanium dioxide prepared by ball milling, as disclosed in Arvidson et al. U.S. Patent No. 2,999,839.

*Table*

EFFECT OF METHOD OF PREPARING DISPERSION ON FIBER COLOR

| Method of Preparing Dispersion | Percent Yellowness | | |
|---|---|---|---|
| | As-Spun | After 16 Hours' Fumes | After 32 Hours' UV |
| Example | 3.7 | 10.6 | 3.9 |
| Ball Milling | 5.2 | 15.0 | 4.8 |

The exposure to ultraviolet light is carried out in a Fade-O-Meter, a testing instrument made by the Atlas Electric Devices Company, described in Standard Test Method 16A–56 in the Technical Manual and Yearbook of the American Association of Textile Chemists and Colorists, vol. 32 (1956), page 86. The exposure is made to a Pyrex-enclosed carbon arc, 14% of the light from which is in the ultraviolet region of 3000 to 4300 Angstroms. The samples are placed a distance of 8 inches from the light source and exposed for 32 hours. The fume-fading tests are made in a chamber similar to that described on pages 90 and 91 of the aforesaid technical manual. The combustion fumes supplied to the cabinet are generated by a Meker laboratory burner supplied with gas at the rate of 2.0 cubic feet per hour. The temperature of the chamber is held at 60° C. for the 16 hours of exposure.

The "percent yellow" is measured on a colorimeter. it is given by the expression:

$$\text{Percent Yellow} = 100 - 100\left(\frac{B}{R+G+B}\right) \Big/ \left(\frac{B_s}{R_s+G_s+B_s}\right)$$

where B, R, G represent the colorimeter readings for light reflected from a yarn sample and filtered respectively through blue, red and green filters. $B_s$, $R_s$, and $G_s$ are the corresponding values for a standard white reference plate used to zero the instrument. A low value is desirable.

Although the invention is illustrated by metering the dispersion of titanium dioxide and poly DEAM into a polymer solution prepared by a batch process, it is, of course, equally applicable to the incorporation of such dispersions in polymer solutions prepared by any suitable process including continuous polymerization processes. In view of the high degree of uniformity of $TiO_2$ and poly DEAM dispersion, accurate metering of the dispersion into polymer solutions is accomplished. Not only are the filament products improved in color and stability, but the continuity of spinning is greatly improved and the uniformity of the product enhanced. Most importantly, the preferred invention provides an initially whiter fiber product with improved stability against yellowing on exposure to light and fumes.

While the invention is particularly useful for dispersing titanium dioxide and poly DEAM in the preparation of color stabilized elastomeric fibers of segmented copolymers containing aromatic bis-ureylene polymer and polyether, of the type illustrated in the example, it is also useful for dispersing titanium dioxide and other polymeric aliphatic amines to form spinning solutions of elastomeric fiber-forming long chain synthetic segmented copolymers in general. Additional pigments, such as a small amount of ultra-marine blue, and /or spinning solution additives can also be incorporated in the dispersion by adding them to the slurry before grinding. The polymeric aliphatic amine has been found to provide an unexpected improvement in the effectiveness of the sand grinding and the stability of the dispersion obtained when used in the specified concentration.

Since many different embodiments of the invention may be made without departing from the spirit and scope thereof, it is to be understood that the invention is not limited by the specific illustrations except to the extent defined in the following claim.

I claim:

In the process of preparing a dispersion of stabilizer in a spinning solution of elastomeric fiber-forming long chain synthetic segmented copolymers and spinning the solution into filaments, said segmented copolymer having a plurality of low-melting polymeric segments alternating in the polymer chain with high-melting ureylene-containing segments, the polymeric segment being the residue remaining after removal of the terminal hydroxyl groups from a hydroxyl-terminated polymer having a melting point below 60° C. and a second order transition temperature below room temperature, the ureylene-containing segment containing at least one group of the formula

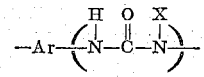

wherein Ar represents an aromatic radical attached to the

group of the formula through a carbon atom of an aromatic ring and X is selected from the group consisting of hydrogen and a monovalent organic radical, the improvement for providing better whiteness and stability against loss of whiteness which comprises sand grinding a slurry of titanium dioxide pigment and poly(N,N-diethyl-beta-aminoethyl methacrylate) in a solvent for the segmented copolymer, containing 27–33 parts by weight of pigment and 27–33 parts of polymeric amine per 100 parts of slurry, by high speed agitation with 70–120 parts of 20–40 mesh sand per 100 parts of slurry and then separating the sand to reduce the pigment agglomerates to a particle size of 0.1–1.0 micron and provide a stable homogeneous dispersion having a viscosity in the range of 5–40 poises, and intimately mixing this initial slurry with a solution of the segmented copolymer to provide a spinning solution containing 0.5–10% of titanium dioxide, 0.5–10% of the polymeric amine and a concentration of the segmented copolymer suitable for extrusion into filaments.

References Cited in the file of this patent
UNITED STATES PATENTS

| | | |
|---|---|---|
| 2,855,156 | Hochberg et al. | Oct. 7, 1958 |
| 2,955,324 | Morgan | Oct. 11, 1960 |
| 2,999,839 | Arvidson et al. | Sept. 12, 1961 |

FOREIGN PATENTS

| | | |
|---|---|---|
| 538,977 | Canada | Apr. 2, 1957 |